(12) United States Patent
Minier et al.

(10) Patent No.: US 6,562,396 B1
(45) Date of Patent: May 13, 2003

(54) METHOD AND INSTALLATION FOR CONVERTING AND PREPARING RICE AND CONVERTED RICE GRAIN LOT

(75) Inventors: Chantal Minier, Aubagne (FR); Isabelle Arekion, Marseilles (FR); Olivier Lepez, Viarmes (FR)

(73) Assignee: Rivoire et Carret-Lustucru, Marseilles (FR)

( * ) Notice: Subject to any disclaimer, the term of this patent is extended or adjusted under 35 U.S.C. 154(b) by 0 days.

(21) Appl. No.: 09/719,489

(22) PCT Filed: Jun. 15, 1999

(86) PCT No.: PCT/FR99/01419

§ 371 (c)(1),
(2), (4) Date: Jan. 2, 2001

(87) PCT Pub. No.: WO99/65332

PCT Pub. Date: Dec. 23, 1999

(30) Foreign Application Priority Data

Jun. 17, 1998 (FR) .............................................. 98 07627

(51) Int. Cl.$^7$ ............................................... A23L 1/182
(52) U.S. Cl. ........................ 426/618; 426/462; 426/627
(58) Field of Search ................................ 426/618, 627, 426/462

(56) References Cited

U.S. PATENT DOCUMENTS

| 179,206 A | * | 6/1876 | Raeburn ...................... 426/618 |
| 3,674,178 A | * | 7/1972 | Pomara, Jr. ................... 141/160 |
| 4,973,484 A | * | 11/1990 | Pierik .......................... 426/462 |
| 6,416,802 B1 | * | 7/2002 | Lin et al. ..................... 426/238 |

FOREIGN PATENT DOCUMENTS

| CH | 344292 | 3/1960 |
| GB | 2 298 122 | 8/1996 |

\* cited by examiner

Primary Examiner—Helen Pratt
(74) Attorney, Agent, or Firm—Pearne & Gordon LLP

(57) ABSTRACT

The invention concerns a rice-converting installation comprising a chamber with an inlet and an outlet, means for heating the chamber and means for causing the chamber to vibrate and passing rice therein from the inlet to the outlet.

21 Claims, 2 Drawing Sheets

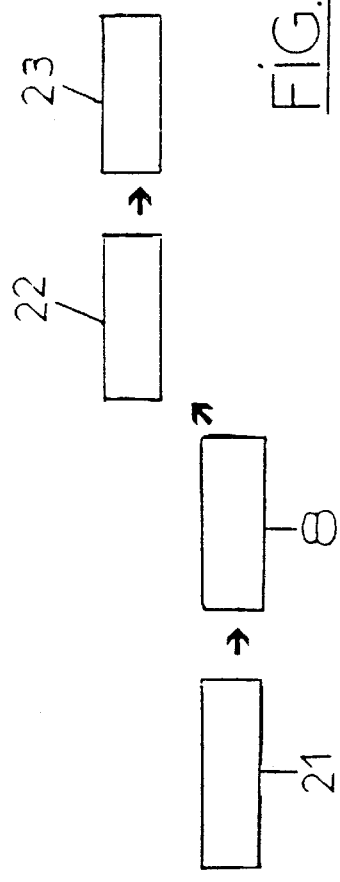
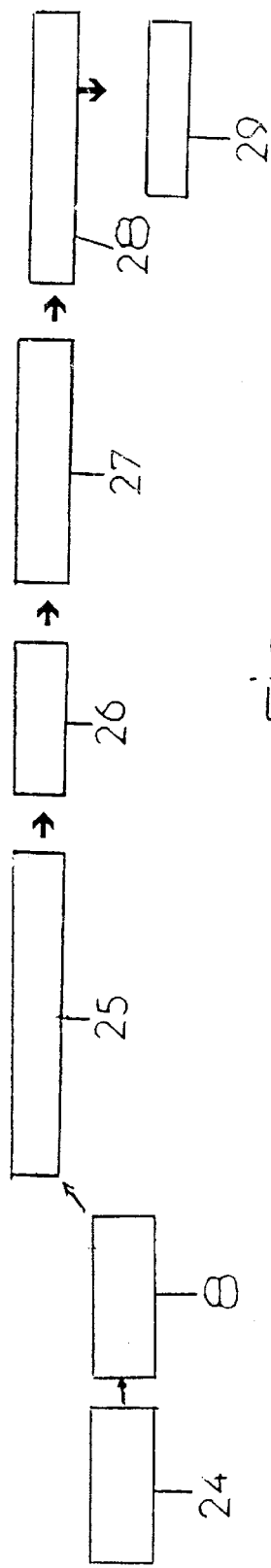

METHOD AND INSTALLATION FOR CONVERTING AND PREPARING RICE AND CONVERTED RICE GRAIN LOT

The present invention relates to processes and plants for parboiling and preparation of rice and to parboiled rice.

Parboiled rice is a rice that has been subjected to steeping, thermal treatment, drying and, often, machining. This treatment permits, in particular, a non-sticky rice to be obtained, the grains of which are intact, but with the drawback that the cooking-time is longer.

The invention overcomes this drawback by virtue of a process for parboiling rice, both paddy rice and cargo rice, that permits parboiled rice to be obtained having a greatly shortened cooking-time.

The process according to the invention consists in steeping the rice in water at a temperature lower than 70° C. under such conditions and for such a time that, after removal of the surface water by drainage or spin-drying, steeped rice is obtained having a moisture content by weight greater than 31%. Afterwards a gelatinisation of the steeped rice is carried out by heating it to a temperature greater than 130° C. while maintaining the moisture content by weight greater than 20% for a sufficient period to obtain core-gelatinised rice. In accordance with the invention, gelatinisation is carried out by causing the steeped rice to pass continuously into an enclosure so as to limit, by virtue of the equilibrium which is established within the enclosure between the moisture content of the rice which is undergoing gelatinisation and the moisture content of the gaseous atmosphere of the enclosure, the quantity of vapour emitted from the rice during gelatinisation, in order to maintain the moisture content by weight of the rice in the course of gelatinisation at a value greater than 20%, and by heating up the steeped rice in the enclosure essentially by conduction so as not to increase the moisture content by weight of the gelatinised rice appreciably, and in particular so as not to exceed a content of 28%.

By proceeding in this way, two pitfalls are avoided. If the rice is heated up by a current of hot air, drying necessarily occurs which reduces the moisture content of said rice very rapidly, bringing about fissuring of the grains of rice. Moreover, a treatment by a current of hot air—by reason of its necessary brevity if the grain is not to be roasted—is really not very homogeneous because, by reason of the rapidity of the release of the water, certain grains no longer have enough thereof for gelatinisation of the starch to take place properly. If, on the other hand, gelatinisation is carried out by a treatment with steam under pressure, the moisture content by weight exceeds 28% or thereabouts. It is found that this reinforces the texture of the grain that has less porosity. The cooking-time is then very considerable. By confining the rice within an enclosure and by heating it up by conduction, and not by convection with the aid of a hot fluid, in particular by contact with the metallic enclosure which is heated up by passage of current or by an external jacket through which heat-exchanging fluid is passing, the moisture content of the rice can be brought well under control while the temperature thereof is raised in order to gelatinise it.

Steeping is carried out, in general, for at least three hours at a temperature from 40 to 70° C., it being possible for the time to be shorter, the more elevated the temperature. The ratio of the volume of the rice to that of the water is at least 2.5. Steeping can be carried out in a vat or in a hopper. The drainage device may be a vibrating filter which ensures separation of the water that is situated on the surface of the grains of rice, constituting, in particular, from 2 to 3% by weight.

In general, the gelatinised rice is dried to a moisture content by weight of 11 to 13% in order to obtain marketable rice, and, if need be, the dried rice is also machined.

The duration of passage or dwell-time of the steeped rice within the enclosure preferably amounts to between four and ten minutes. Above ten minutes, the moisture content of the rice might diminish too much.

It can be ensured that, in a steady state, the rice occupies from 5 to 30% of the volume of the enclosure.

In order to prevent certain grains of rice from remaining continually in contact with the heated enclosure and being roasted, it is preferred to displace the rice in the enclosure by causing the enclosure to vibrate, so that it is never the case that the same grains of rice are in contact with the enclosure.

The invention also provides a process for preparation of rice, which consists in parboiling it by the process according to the invention, in cooling it to ambient temperature (15 to 30° C.) while maintaining its moisture content at more than 19%, in machining the cool rice, in reheating it to at least 75–80° C., then in flattening the reheating rice and in drying it to a moisture content of 11 to 13%.

At the end of the parboiling process the grains are transferred into a drying column, in order to be cooled therein. In this column the rice is traversed by a current of air at ambient temperature. In this way this rice is brought back to ambient temperature, losing from 3 to 5% of moisture.

The machining is implemented by successive passage through 3 machining cones that are used conventionally in order to blanch rice.

For example, and most often, these appliances are composed of a metallic truncated cone which is lined with an abrasive layer and which rotates within an enclosure constituted by a perforated sheet of exactly the same shape but slightly larger. The rice is introduced between the truncated cone and the metallic housing; it is disposed in a ring, rotating with the truncated cone. The blanching of the grains results from the rubbing of the grains against the abrasive surface and also the rubbing of the grains against one another. In order to implement complete blanching, that is to say the exposing of the albumen of the grain, the grains of rice that have been machined are immediately subjected to heating and flattening.

The moisture content of the rice at the end of the machining amounts to between 17 and 20% of moisture. If the flattening of the grains takes place without prior reheating, by passing between cold metallic rollers, the appearance is observed of numerous cracks in damaged grains, a part of which has been torn out in the course of flattening. The cracks in the product show an increase amounting to 20% by weight. Only 25% of the grains remain intact, not deformed and with no missing part.

The reheating of the grains above their gelatinisation temperature, from 60° to 75° C. depending on the varieties, permits their plasticity to be increased appreciably by crossing the glass transition temperature of starch. This heating has to be carried out without altering the moisture content of the grains. Heating in hot air, for example, would cause a rapid lose of moisture and a stiff of the grain with appreciable fissuring and cracking.

The use of infrared rays to reheat the grains is entirely appropriate; treated in a monolayer, the grains pass from 25° C. to 80° C. within 20 seconds without a change in their moisture content. The grains that have been reheated in this way can be flattened without formation of cracks and with a proportion of fissured grains (fissures visible to the naked eye) lower than 10% (number of fissured grains/number of total grains).

The flattening is carried out by passage between two metallic rollers, for example the rollers that are used in order to flocculate cereals. The spacing between the rollers is regulated between 0.2 and 0.5 mm, preferably between 0.3 and 0.4 mm, in order to obtain the effect on the grains that is being sought. The identical speed for the two rollers is regulated between 20 and 60 rpm, preferably between 30 and 50 rpm.

Flattened grains of rice are then immediately transferred into a drying column, where they are traversed by a current of air at a temperature lower than 50° C. In this way they are progressively brought back to a moisture content of 11 to 13%, in order to be conditioned afterwards.

The thickness of the grains is measured in the following way.

The cross-section of the grain through its middle causes an ovoid surface to appear.

The thickness E taken into account by the measurement is the smallest section taken through the middle of the grain.

In practice, the measurement of the thickness E is carried out with sliding callipers on the middle of the grain, viewed in profile.

After flattening and final drying, the mean thickness E of 100 grains taken at random is lower by at least 15% than the thickness E of the dry grain that has not been flattened. The flattening will preferably cause the thickness of the grain to diminish by 20 to 25%, it being understood that B should not be lower than 0.9 mm nor greater than 1.3 mm. Below the lower value the grains are too flat, resembling discs, and cannot reasonably be described as grains of rice. For the uninformed consumer they fall into the category of flakes. It is preferred that E amounts to between 1.1 and 1.2 mm.

After flattening and drying, the rice that is obtained exhibits more than 90% of non-fissured grains. The fissured grains are described as cleaved rice; they exhibit one or more fractures which are clearly visible to the naked eye, which are always transverse and which extend from one side of the grain to the other. These fractures are the result of excessive stresses within the grain which are generated by too extreme differences in temperature and/or in moisture between the interior and the periphery of the grains.

The invention also provides a plant for parboiling rice, which comprises, successively, a steeping vat, a drainage device and an enclosure having an inlet and an outlet, means for heating the enclosure and means intended to cause the enclosure to vibrate in order to cause the rice to pass therein from the inlet to the outlet.

The continuous plant according to the invention permits all the grains to be treated in individualised and homogeneous manner and behaves, at the same time, as a heat-exchanger and as a divided gas/solid chemical reactor.

As soon as they have entered the enclosure, the grains of rice will be individually heated by contact with the hot wall of the enclosure. The moisture that is contained uniformly in the grain will be progressively converted into steam as the grain becomes heated up. During this same time the roof of the enclosure will be charged with water vapour and will maintain a moisture content around the grain which limits its dehydration and thus permits complete gelatinisation of the starch.

In order that the treatment proceeds in satisfactory manner and that the grains are completely transformed, the passage-time must permit the temperature of the grain to be raised to 130° C.

The dwell-time of the grains in the enclosure is governed by the length thereof and by the frequency of vibration that is applied. The dwell-time is regulated as indicated above, in order to obtain a good containment of the grains of rice within the enclosure, which limits the lose of water and maintains the atmosphere of vapour around the grain.

In one embodiment the invention provides a plant in which there are provided at the outlet of the enclosure, successively, a cooling device, a machining device, a heating device, a flattening device and a drying device.

The invention also provides a batch of grains of parboiled and non-fissured rice which is characterized in that at least 90% of the grains are core-gelatinized according to the alkali test and have a firmness lower than 62 in the Chopin visco-elastograph (alveograph) after being immersed in boiling water for eight minutes.

It is found, in fact, that the grains of parboiled rice according to the invention are gelatinized in a very homogeneous manner and that, in particular, 99% of the grains and even 100% of them are gelatinized and, nevertheless, entirely unexpectedly, the rice that has been parboiled in this way cooks very rapidly.

In addition, if grains having an amylose content by weight lower than 15% relative to dry matter are chosen as grains of rice to be treated, it is found that parboiled rice according to the invention can be cooked in 5 minutes. The varieties of rice that have this amylose content are, in particular, Khao Dawk Mali (Thailand), Miara (France) and Horn Mali (Thailand).

This short cooking-time is also obtained with rice not having this amylose content it said rice is subjected to the process described above by a flattening operation being implemented.

The alkali test is carried out as follows: 100 parboiled grains of rice are placed in a 1.7% solution by weight of KOH for 20 hours.

After 20 hours of reaction the degradation sustained by the grains is observed:
 intact grains:non-gelatinised grains
 grains dispersed in an opaque chalky mass:only slightly gelatinised grains
 completely translucent dispersed grains without chalky opaque core:totally gelatinised grains.

The Chopin visco-elastograph permits the visco-elastic characteristics of the cooked rice to be evaluated by assessing its deformation under the application of a constant force of 700 g for 20 seconds and then relaxation of the force for 40 seconds.

For the measurement in the visco-elastograph, 100 g of rice are cooked in one liter of boiling water. At the end of the cooking the grains are drained for one minute on a sieve with a mesh size of 1.25 mm and are then left to cool for 15 minutes in a 60-mm Petri dish which is placed on a moist sponge plate and covered by an 80-mm Petri dish in such a way that the latter creates a seal with the water which saturates the sponge plate. Three grains that have been cooled in this way are then placed on the visco-elastograph. The thickness E of the grains before application of the force and the thickness $e_1$ after flattening are noted. From these values the firmness $F=100. (e_1/E)$ is calculated. Six measurements are carried out in respect of the same cooking, in order to calculate the mean and the standard deviation of the six results obtained.

Moreover, these grains of rice which have been parboiled in accordance with the invention, having an amylose content by weight lower than 15% relative to dry matter, have the following property: the cooked grains, placed in a hermetically sealed receptacle and put in the refrigerator at 4° C. for 6 days, have a firmness measured in the visco-elastograph at least equal to 120% of that which they have 15 minutes after cooking. This property is very much sought-after, particularly when a dish has to be prepared in advance.

BRIEF DESCRIPTION OF DRAWINGS

FIGS. 2 and 3 illustrate two plants according to the invention.

Figure 1:
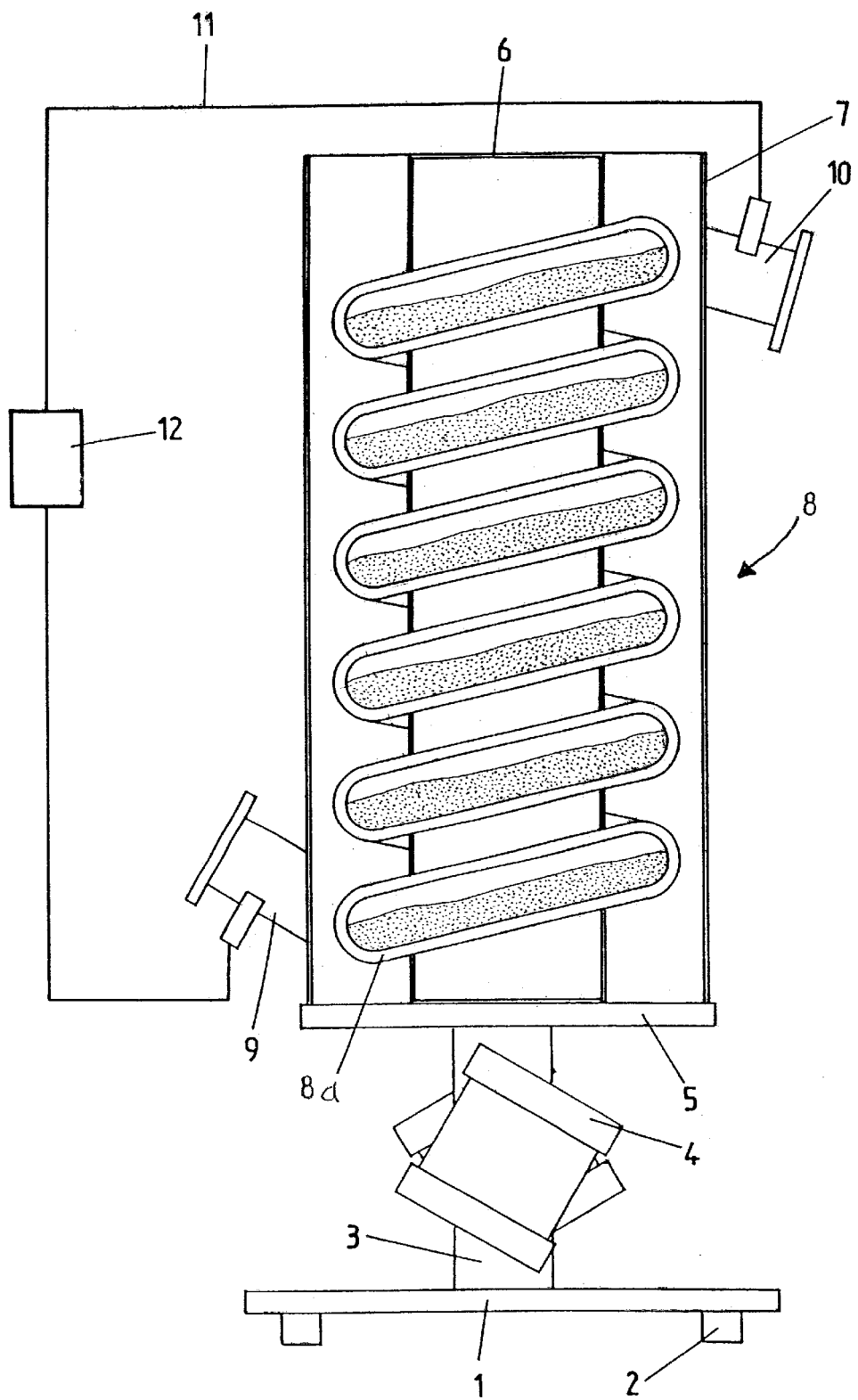
FIG. 1 of the attached drawing illustrates a part of the plant according to the invention.

The part that is shown in FIG. 1 is a steaming enclosure 8 that consists of a baseplate 1 which is mounted on damping blocks 2. Stemming from this baseplate is an upright 3 on which there are mounted unbalance motors 4 which cause a plate 5 to vibrate.

On this plate 5 there are bolted an internal drum 6 and, coaxially with the latter, a drum 7. The space between the drums 6 and 7 is filled up with a thermally and electrically insulating material. A metallic coil 8a is fixed around the drum 6 and meanders from an inlet 9 to an outlet 10 of the coil 8a and the steaming enclosure 8. The inlet and outlet 9 and 10 are connected by an electrical heating circuit 11 to an electric-current generator 12. The inlet 9 is supplied from a vibrating filter serving as a drainage device, which itself is supplied with moist rice by a conveyor belt originating from a steeping vat.

The plant according to the invention that is represented in FIG. 2 comprises, successively, a steeping vat 21, a steaming enclosure 8, a drying device 22 and a machining device 23.

The plant of FIG. 3 comprises, successively, a steeping vat 24, a steaming enclosure 8, a cooling device 25, a machining device 26, a reheating device 27, a flattening device 28 and a drying device 29.

The following Examples illustrate the invention. In these Examples, the parts and percentages are expressed in weight, unless otherwise stated.

EXAMPLE 1

1 to 600 kg of Khao Dawk Mali cargo rice are placed in a vat and covered by 1,500 liters of water at 65° C. The rice is left in contact with the water for 3 hours. The steeping water is then discharged, and the rice is extracted from the vat by gravity and drained on a vibrating filter which comprises a vibration-generator, a sieve constituted by rustproof gauze soldered to a rustproof frame and a anti-clogging system with nylon rings. Its moisture content is then equal to 31.4%. It is then conveyed by a proportioning screw operated by a frequency controller at a rate of flow from 100 to 600 kg/h (in accordance with various trials which have all given satisfaction) to an enclosure constituted by a coil with a length of 64 m and an internal diameter of 110 mm, the walls of which have been heated up beforehand to 190° C. The rice is transported from the inlet to the outlet of the enclosure by vibration at a speed of 7 m/minute. Its dwell-time is 8 minutes. Its temperature that is attained at the outlet of the enclosure is 130° C. Its moisture content is 25.5%. The cargo rice that has been treated in this way is then transported to columns for drying in hot air, where its moisture content is brought back to 12.5% for its preservation. It is then machined in accordance with the traditional process.

The rice that has been treated in this way and subjected to the alkali test exhibits 98% of completely translucent grains, that is to say completely gelatinised grains.

Its density is equal to 95% of the density of the same grain that has been machined but not treated. No fissure is visible to the eye or to the binocular magnifier.

This rice cooks for 5 minutes in boiling water and, cooled for 15 minutes in accordance with the protocol described above, exhibits the following texture characteristics which are measured in the visco-elastograph:

Fmean=59.0; standard deviation of 6 measurements=1.2

EXAMPLE 2

600 kg of Thai-Bonnet cargo rice are treated in accordance with the process described in Example 1. The dwell-time within the enclosure here is 9 minutes. Its temperature that is attained at the outlet of the enclosure is 140° C. Its moisture content is 21.8%. The rice that has been treated in this way and subjected to the alkali test exhibits 95% of completely translucent grains, that is to say completely gelatinised grains.

Its density is equal to 96% of the density of the same grain that has been machined but not treated. No fissure is visible to the eye or to the binocular magnifier.

This rice cooks for 8 minutes in boiling water and, cooled for 15 minutes in accordance with the protocol described above, exhibits the following texture characteristics which are measured in the visco-elastograph:

Fmean=59.5; standard deviation of 6 measurements=2.7

EXAMPLE 3

600 kg of Thai-Bonnet paddy are treated in accordance with the process described in Example 1. The steeping-time here is 7 hours and the temperature is 68° C. The desired temperature value for the enclosure is 230° C. The dwell-time within the enclosure is 8 minutes. The temperature of the rice that is attained at the outlet of the enclosure is 155° C. Its moisture content is 22.1%.

The rice that has been treated in this way and subjected to the alkali test exhibits 95% of completely translucent grains, that is to say completely gelatinised grains.

Its density is equal to 96% of the density of the same grain that has been machined but not treated. No fissure is visible to the eye or to the binocular magnifier.

This rice cooks for 8 minutes in boiling water and, cooled for 15 minutes in accordance with the protocol described above, exhibits the following texture characteristics which are measured in the visco-elastograph:

Fmean=55.3; standard deviation of 6 measurements=4.3

Comparative Example 1

1 kg of Thai-Bonnet cargo rice is steeped in accordance with the process described in Example 1, then after drainage it is subjected to a current of hot air at 200° C. for 20 seconds. The moisture content of the treated rice is then 23%. Afterwards the rice is dried and is then machined in accordance with the process of Example 1.

This rice which has been treated in this way and subjected to the alkali test exhibits 30% of grains that are still opaque, that is to say only partially gelatinised. Numerous grains are more fissured.

Comparative Example 2

1 kg of Thai-Bonnet cargo rice is steeped in accordance with the process described in Example 1, then after drainage it is subjected to a treatment with steam under pressure of 2 bar for 20 seconds. Afterwards the rice is dried and is then machined in accordance with the process described in Example 1.

This rice cooks for 8 minutes in boiling water and, cooled for 15 minutes in accordance with the protocol described above, exhibits the following texture characteristics which are measured in the visco-elastograph:

Fmean=70.1; standard deviation of 6 measurements=0.7

EXAMPLE 4

600 kg of Thai-Bonnet cargo rice are treated in accordance with the process described in Example 2 until reaching the outlet of the steaming enclosure. The grains are then transported to a drying column, where they are cooled to 25° C. by a flow of ambient air. The dwell-time in the column is 15 min; the moisture content of the rice comes down to 18%.

The rice is then machined by successive passage through 3 machining cones which generate between 8 and 9.5% of utility flour and 4% of cracks.

The rice is then routed to a vibrating belt which is heated by infrared lamps. The temperature of the grains reaches 85° C. within 20 seconds. The moisture content of the grains is 17.5%. This belt also serves as a feed for the passage between the two metallic rollers which are going to implement the flattening of the grains. The spacing between the rollers is regulated to 0.35 mm; their speed is regulated to 40 rpm. At the outlet the flattened grains are rapidly routed to the drying columns, where their moisture content is brought back to 12.5%.

The rice that has been treated in this way and subjected to the alkali test exhibits 98% of completely translucent grains, that is to say completely gelatinised grains.

Its density is equal to 94% of the density of the same rice that has been machined but not treated. 4% of the grains exhibit fissures which are visible to the naked eye. The mean thickness of the grains is 1.2 mm, that is to say a reduction of 23% in comparison with the thickness of the grains treated in accordance with Example 2. The proportion of cracks remains identical to that determined after machining, that is to say 4%.

This rice cooks for 5 min in boiling water and, cooled for 15 min in accordance with the protocol described above, exhibits the following texture characteristics which are measured in the visco-elastograph:

Fmean=61.4; standard deviation of 6 measurements=1.4

EXAMPLE 5

600 kg of Khao Dawk Mali cargo rice are treated in accordance with the process described in Example 1 until reaching the outlet of the steaming enclosure. The grains are then transported to a drying column, where they are cooled to 25° C. by a flow of ambient air. The dwell-time in the column is 15 min; the moisture content of the rice comes down to 20%.

The rice is then machined by successive passage through 3 machining cones which generate between 8 and 9.5% of utility flour and 6% of cracks.

The rice is then routed to a vibrating belt which is heated by infrared lamps. The temperature of the grains reaches 80° C. within 20 seconds. The moisture content of the grains is 18.5%. This belt also serves as a feed for the passage between the two metallic rollers which are going to implement the flattening of the grains. The spacing between the rollers is regulated to 0.30 mm; their speed is regulated to 45 rpm. At the outlet the flattened grains are rapidly routed to the drying columns, where their moisture content is brought back to 12.5%.

The rice that has been treated in this way and subjected to the alkali test exhibits 99% of completely translucent grains, that is to say completely gelatinised grains.

Its density is equal to 93% of the density of the same rice that has been machined but not treated. 6% of the grains exhibit fissures which are visible to the naked eye. The proportion of cracks is 6%, identical to that determined after machining. The mean thickness of the grains is 1.1 mm, that is to say a reduction of 25% in comparison with the thickness of the grains treated in accordance with Example 2.

This rice cooks for 3 min in boiling water and, cooled for 15 min in accordance with the protocol described above, exhibits the following texture characteristics which are ameasured in the visco-elastograph:

Fmean=60.9; standard deviation of 6 measurements=2.1

Comparative Example 3

1 kg of Thai-Bonnet cargo rice is steamed and cooled in accordance with the process described in Example 4. The grains are then directly flattened at ambient temperature without prior reheating. At the end of the flattening, 48% of fissured grains and 17% of cracks are observed. Only 23% of the grains are intact and whole.

What is claimed is:

1. A process for parboiling paddy rice or cargo rice, comprising steeping said rice in water at a temperature lower than 70° C. under such conditions and for such a time that, after drainage or spin-drying, steeped rice is obtained having a moisture content by weight greater than 31%, then in carrying out a gelatinization of the steeped rice by heating it to a temperature greater than 130° C. while maintaining the moisture thereof at a content by weight greater than 20% for a sufficient period to obtain core-gelatinized rice, characterized in that said process includes carrying out gelatinization by causing the steeped rice to pass continuously into an enclosure so as to limit, by virtue of the equilibrium which is established within the enclosure between the moisture content of the rice which is undergoing gelatinization and the moisture content of the gaseous atmosphere of the enclosure, the quantity of vapor emitted from the rice during gelatinization, in order to maintain the moisture content by weight of the rice in the course of gelatinization at a value greater than 20%, and by heating the steeped rice in the enclosure essentially by conduction so as not to increase the moisture content by weight of the gelatinized rice appreciably.

2. Process according to claim 1, which consists in drying the gelatinised rice to a moisture content by weight of 11 to 13%.

3. Process according to claim 2, further including machining the dried rice.

4. Process according to claim 1, characterised in that the duration of passage of the steeped rice in the enclosure amounts to between four and six minutes.

5. A process according to claim 4, further including the steps of cooling the rice to a temperature in the range of from about 15 to about 30° C. while maintaining its moisture content at more than 19%, machining the cooled rice, reheating the rice to at least 75–80° C., then flattening the reheated rice and drying it to a moisture content of 11 to 13%.

6. Process according to claim 1, characterised in that, in a steady state, the rice occupies from 5 to 30% of the volume of the enclosure.

7. A process according to claim 6, further including the steps of cooling the rice to a temperature in the range of from about 15 to about 30° C. while maintaining its moisture content at more than 19%, machining the cooled rice, reheating the rice to at least 75–80° C., then flattening the reheated rice and drying it to a moisture content of 11 to 13%.

8. Process according to claim 1, characterised in that it comprises displacing the rice in the enclosure by causing the enclosure to vibrate.

9. A process according to claim 8, further including the steps of cooling the rice to a temperature in the range of from about 15 to about 30° C. while maintaining its moisture content at more than 19%, machining the cooled rice, reheating the rice to at least 75–80° C., then flattening the reheated rice and drying it to a moisture content of 11 to 13%.

10. Process according to claim 1, characterised in that the moisture content by weight of the gelatinised rice remains lower than 28%.

11. A process according to claim 10, further including the steps of cooling the rice to a temperature in the range of from about 15 to about 30° C. while maintaining its moisture content at more than 19%, machining the cooled rice, reheating the rice to at least 75–80° C., then flattening the reheated rice and drying it to a moisture content of 11 to 13%.

12. A process according to claim 1, further including the steps of cooling the rice to a temperature in the range of from about 15 to about 30° C. while maintaining its moisture content at more than 19%, machining the cooled rice, reheating the rice to at least 75–80° C., then flattening the reheated rice and drying it to a moisture content of 11 to 13%.

13. A plant for the parboiling of rice comprising, successively, a steeping vat, a drainage device for draining the rice to a water content by weight greater than 31% and an enclosure having an inlet and an outlet, means for heating the enclosure to increase the temperature of the rice to a temperature greater than 130° C. without substantially increasing the moisture content of the rice and means intended to cause the enclosure to vibrate in order to cause the rice to pass therein from the inlet to the outlet.

14. Plant according to claim 13, further comprising a cooling device, a machining device, a reheating device, a flattening device and a drying device successively at the outlet of the enclosure.

15. A batch of grains of parboiled and non-fissured rice, characterized in that at least 90% of the grains are core-gelatinized according to the alkali test and have a firmness measured in the Chopin visco-elastograph lower than 62 after being immersed in boiling water for eight minutes.

16. Batch according to claim 15, characterised in that the grains have an amylose content by weight lower than 15% relative to dry matter and have a firmness measured in the Chopin visco-elastograph lower than 62 after being immersed in boiling water for five minutes.

17. Batch according to claim 16, characterised in that the cooked grains, placed in a hermetically sealed receptacle and put in the refrigerator at 4° C. for 6 days, have a firmness, measured in the visco-elastograph, at most equal to 120% of that which they have 15 minutes after cooking.

18. A batch of grains of parboiled and blanched rice, characterized in that at least 90% of the grains are core-gelatinized according to the alkali test and have a firmness measured in the Chopin visco-elastograph lower than 62 after being immersed in boiling water for five minutes, at least 90% of the grains are not fissured, and the mean thickness of the grains amounts to between 0.9 and 1.3 mm.

19. Batch according to claim 18, characterised in that the grains have an amylose content by weight lower than 15%.

20. A batch of grains of parboiled and non-fissured rice, characterized in that at least 99% of the grains are core-gelatinized according to the alkali test and have a firmness measured in the Chopin visco-elastograph lower than 62 after being immersed in boiling water for eight minutes.

21. A batch of grains of parboiled and blanched rice, characterized in that at least 99% of the grains are core-gelatinized according to the alkali test and have a firmness measured in the Chopin visco-elastograph lower than 62 after being immersed in boiling water for five minutes, at least 90% of the grains are not fissured, and the mean thickness of the grains amounts to between 0.9 and 1.3 mm.

* * * * *